Patented Aug. 14, 1945

2,382,882

UNITED STATES PATENT OFFICE 2,382,882

ISOMERIZATION OF SATURATED HYDROCARBONS

Vladimir N. Ipatieff and Herman Pines, Riverside, Ill., assignors to Universal Oil Products Company, Chicago, Ill., a corporation of Delaware No Drawing. Application March 3, 1943,
Serial No. 477,881

7 Claims. (Cl. 260—683.5)

This application is a continuation-in-part of our co-pending application Serial #386,111, filed March 31, 1941 which is a continuation-in-part of our co-pending application Serial #328,321, filed April 6, 1940, which has issued as Patent No. 2,353,899, July 18, 1944, and which in turn is a continuation-in-part of our application Serial #238,066, which was filed October 31, 1938.

The present invention relates to the treatment of saturated hydrocarbons to produce isomers thereof which are, in general, more reactive chemically. The process involves the use of special catalyst and particular conditions of operation to favor isomerization so that the desired isomers are produced efficiently and in relatively high yields.

This invention is applicable to the treatment of normal butane and normally liquid paraffin hydrocarbons which are capable of isomerizing under properly regulated conditions of treatment. It is also applicable to the treatment of hydrocarbon mixtures containing substantial quantities of paraffins and naphthenes such as, for example, straight run gasolines or fractions thereof. Straight run gasoline fractions having a low antiknock value may be converted into valuable motor fuels having a high antiknock value by treatment in accordance with the process herein disclosed.

In one specific embodiment, the present invention comprises a process for the conversion of isomerizable saturated hydrocarbons to produce isomers thereof which comprises subjecting said hydrocarbons in the presence of a hydrogen halide to contact with a catalyst composite comprising a mixture of an aluminum halide and zinc halide, the weight of the aluminum halide present in the mixture being at least equivalent to that of the zinc halide and the mixture being brought to a state of fusion prior to its use.

The feature of the present invention is broadly based on the finding that an unexpected degree of selectivity is obtained in the isomerization reaction when employing the previously fused catalyst composite in which the weight of aluminum halide is at least equivalent to that of the zinc halide. Later examples presented herein will indicate the exact extent of this benefit. In view of the present stage of knowledge as to the mutually cooperative effect in mixed catalyst composites, it is difficult to form a basis for explaining the unexpected results obtained when using a previously fused mixture of the type mentioned above. One possible explanation for these results is the fact that during the fusion, the halides are miscible and upon cooling, a catalyst is formed having the more active aluminum halide evenly distributed throughout the entire catalyst mass. The improved results which are obtained with the desired aluminum halide concentration are probably due to a chemical interaction of the metal halides to form salts of definite composition which function as the real catalyst.

The term "halides" as used in this specification and appending claims is intended to include only the chlorides, bromides and iodides, since extensive experimentation has indicated that the fluorides have substantially no catalytic activity for the isomerization reaction.

In preparing catalyst composites of the present type, the metal halides are mixed in regulated proportions and preferably in finely divided states and heated to a temperature above the fusing point of the mixture under superatmospheric pressure, if necessary to prevent volatilization of any of the more volatile ingredients such as, for example, aluminum chloride. The material produced is then granulated and may then be used either in batch operations in which it is suspended in the hydrocarbons to be isomerized or as a filler in reaction tubes or chambers through which the hydrocarbons are passed. It is essential that the isomerizable hydrocarbons contact the composite catalyst in the presence of a hydrogen halide or compounds generating a hydrogen halide in situ which acts as a promoter for the isomerization reaction. The hydrogen halide concentration will ordinarily be less than 40% by volume of the hydrocarbon charge and ordinarily within the range of 5–20 volume per cent. Undesirable decomposition reactions may be substantially reduced by the use of hydrogen pressure in the reaction zone. As will be shown in later examples, the catalyst composites prepared by the method described above show definitely better results in promoting the isomerization reaction than mechanical mixtures of the two salts in the same proportions, no matter how finely divided or how intimately mixed without fusion. The temperatures which may be employed in effecting the isomerization reaction in accordance with the present invention, extend over a considerable range depending upon the proportions of the individual metallic halides present in the catalyst shown and the type of operation employed. Temperatures from ordinary atmospheric of about 20° C. to as high as 300° C. and superatmospheric pressures up to 500 pounds or more may be employed. The preferred temperatures for the operation will fall within the range of approximately 50 to 200° C.

Batch operations are conducted in vessels of suitable construction for withstanding the operating pressures and equipped with mechanical stirring devices to insure good contact of the catalyst particles with the hydrocarbons. The time of contact will vary somewhat with the temperature used and the efficiency of the contact with the catalyst. After completion of the treatment, the vessel may be cooled and the hydrocarbon products fractionated to recover the desired isomers from the unconverted materials which may be subjected to further isomerization treatment. Continuous operations may be conducted by placing the granular catalytic material in reaction tubes and passing the hydrocarbons either in vapor, liquid or mixed phase over the granular material in the presence of a hydrogen halide. The reaction products are removed from the isomerization zone and introduced into subsequent fractionating equipment for the separation of the desired product. Another type of operation which may be employed when using the catalyst of the present invention consists of suspending finely divided powdered catalyst in a stream of the hydrocarbons, said hydrocarbons being in either the liquid, vapor or mixed phase and passing the mixture through tubular or suitable baffled elements to maintain turbulence while heating the stream of reactants, catalysts and hydrogen halide to a selected conversion temperature. This conversion step will be followed by fractionation and separation as in the continuous method of operation already described and the separated catalyst may in some instances be recycled for further use.

The following examples are given to indicate the character of the results obtainable in the operation of the process without intending to limit the scope of the invention to exact correspondence with the data presented. Separate runs are shown to indicate the differences in the results obtained when utilizing some of the preferred catalytic materials which had been fused prior to use and a mechanical mixture of the two salts in the same proportion.

*Example I.*—136 parts by weight of normal pentane were heated in a pressure vessel at about 100 to about 150° C. for 4 hours in the presence of 5.4 parts by weight of hydrogen chloride and 26.8 parts by weight of previously fused aluminum chloride-zinc chloride catalyst, the composition of catalyst being about 50% by weight of each component. The following tabulation shows the yields of products in parts by weight.

| | Per cent |
|---|---|
| Isobutane | 7.5 |
| Isopentane | 36.0 |
| Normal pentane | 56.5 |

A repetition of the above experiment using a mechanical mixture of anhydrous aluminum and zinc chlorides in the same proportions gave the following yields of products.

| | Per cent |
|---|---|
| Isobutane | 54 |
| N-butane | 8 |
| Isopentane | 20 |
| N-pentane | 8 |
| Heavier hydrocarbons | 10 |

*Example II.*—60 parts by weight of normal pentane were heated in a pressure vessel at about 80° C. for 2 hours in the presence of 8 parts by weight of hydrogen chloride and 18 parts by weight of previously fused aluminum chloride-zinc chloride catalyst, the composition of the material being about 75% by weight of aluminum chloride. The following yields were obtained.

| | Weight per cent |
|---|---|
| Butanes | 0.7 |
| Isopentane | 57.0 |
| N-pentane | 42.0 |
| $C_6+$ | 0.3 |

A similar experiment using a mechanical mixture of anhydrous aluminum and zinc chlorides in the same proportions gave the following yields in weight per cent of the charge.

| | Per cent |
|---|---|
| Butanes | 23.0 |
| Isopentane | 29.0 |
| N-pentane | 47.3 |
| $C_6+$ | 0.7 |

*Example III.*—Example II was repeated with a previously fused catalyst comprising 65% by weight of aluminum chloride and 35% by weight of zinc chloride. The following results were obtained.

| | Per cent |
|---|---|
| Butanes | 2.0 |
| Isopentane | 55.0 |
| N-pentane | 41.8 |
| $C_6+$ | 1.2 |

Example II was again repeated using a catalyst similar to that used in Example I, that is, a fused mixture containing 50% by weight of each component. The yields of products were as follows:

| | Per cent |
|---|---|
| Butanes | 2.0 |
| Isopentane | 40.6 |
| N-pentane | 56.5 |
| $C_6+$ | 0.9 |

*Example IV.*—Example II was again repeated with a previously fused catalyst comprising 60% by weight of zinc chloride and 40% by weight of aluminum chloride. The following yields were obtained:

| | Per cent |
|---|---|
| Butanes | 3.6 |
| Isopentane | 7.4 |
| N-pentane | 86.7 |
| $C_6+$ | 2.3 |

It will be seen from the above comparative tests that higher conversions and a higher degree of selectivity is obtained when utilizing previously fused composite catalysts in which the aluminum chloride concentration is at least equivalent to that of the zinc chloride. It is also evident from the above data that the fusion prior to use effects some change in the catalytic material which produces highly unexpected and beneficial results.

We claim as our invention:

1. A process for the conversion of an isomerizable saturated hydrocarbon to produce a substantial yield of isomers thereof which comprises subjecting said hydrocarbon under isomerizing conditions and in the presence of a hydrogen halide to contact with a composite catalyst comprising a previously fused mixture of halides of aluminum and zinc, the concentration of aluminum halide in said catalyst being at least equivalent by weight to that of the zinc halide, and recovering the resultant isomerized hydrocarbon.

2. A process for the conversion of an isomerizable saturated hydrocarbon to produce a substantial yield of isomers thereof which comprises subjecting said hydrocarbon at a temperature of from about 20 to about 300° C. to contact in the presence of a hydrogen halide with a composite catalyst comprising a previously fused mixture of halides of aluminum and zinc, the concentration of aluminum halide in said catalyst being at least equivalent by weight to that of the zinc halide, and recovering the resultant isomerized hydrocarbon.

3. A process for the isomerization of a paraffin hydrocarbon to produce a substantial yield of isomers thereof which comprises subjecting said hydrocarbon under isomerizing conditions and in the presence of a hydrogen halide to contact with a composite catalyst comprising a previously fused mixture of halides of aluminum and zinc, the concentration of aluminum halide in said catalyst being at least equivalent by weight to that of the zinc halide, and recovering the resultant isomerized hydrocarbon.

4. The process of claim 1 further characterized in that the composite catalyst comprises a previously fused mixture of aluminum chloride and zinc chloride.

5. A process for the treatment of a hydrocarbon mixture of approximate gasoline boiling range and containing substantial quantities of paraffins to improve the antiknock properties thereof which comprises subjecting said mixture to contact under isomerizing conditions and in the presence of a hydrogen halide with a catalyst composite comprising a previously fused mixture of halides of aluminum and zinc, the concentration of aluminum halide in said catalyst being at least equivalent by weight to that of the zinc halide, and recovering the isomerized mixture.

6. The process of claim 5 further characterized in that the composite catalyst comprises a previously fused mixture of aluminum chloride and zinc chloride.

7. A process for the treatment of a hydrocarbon mixture of approximate gasoline boiling range and containing substantial quantities of paraffins to improve the antiknock properties thereof which comprises subjecting said mixture to contact under isomerizing conditions in the presence of a hydrogen halide and hydrogen with a catalyst composite comprising a previously fused mixture of halides of aluminum and zinc, the concentration of aluminum halide in said catalyst being at least equivalent by weight to that of the zinc halide, and recovering the isomerized mixture.

VLADIMIR N. IPATIEFF.
HERMAN PINES.